Patented Oct. 3, 1939

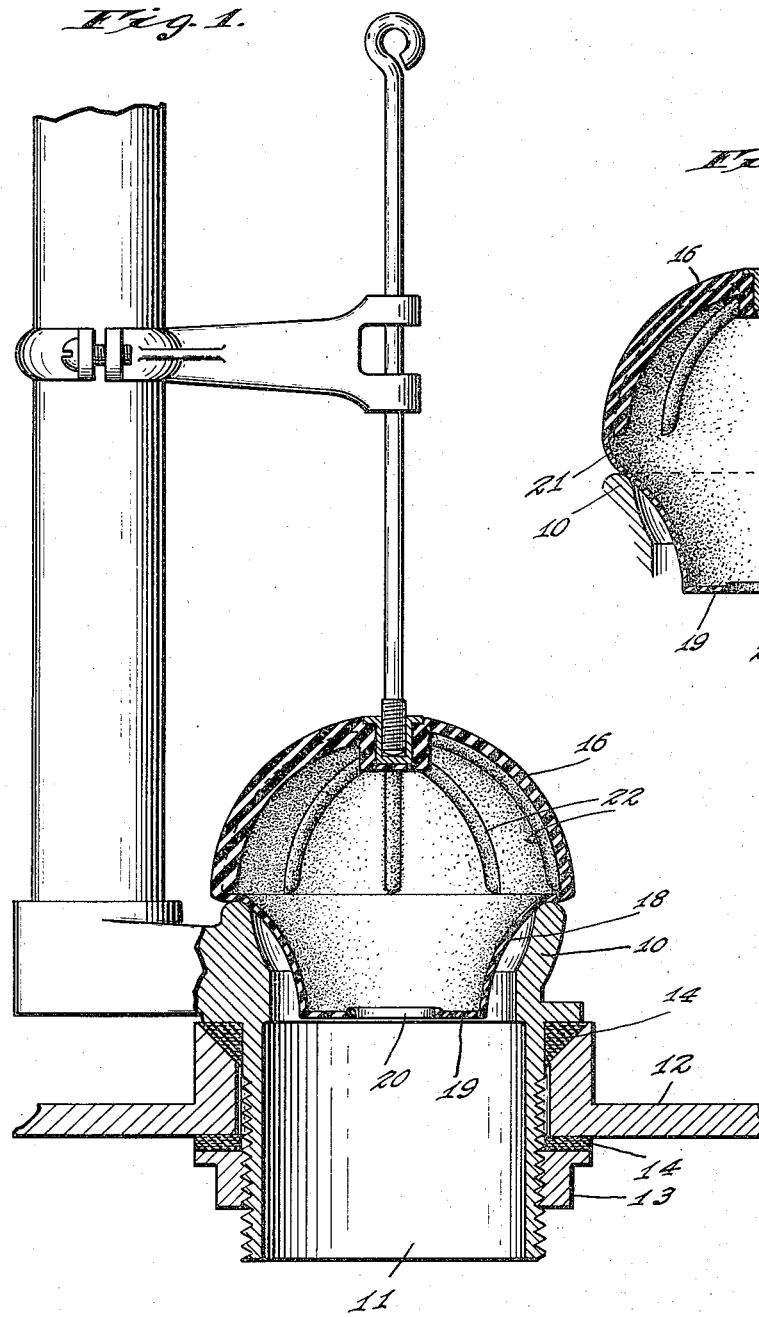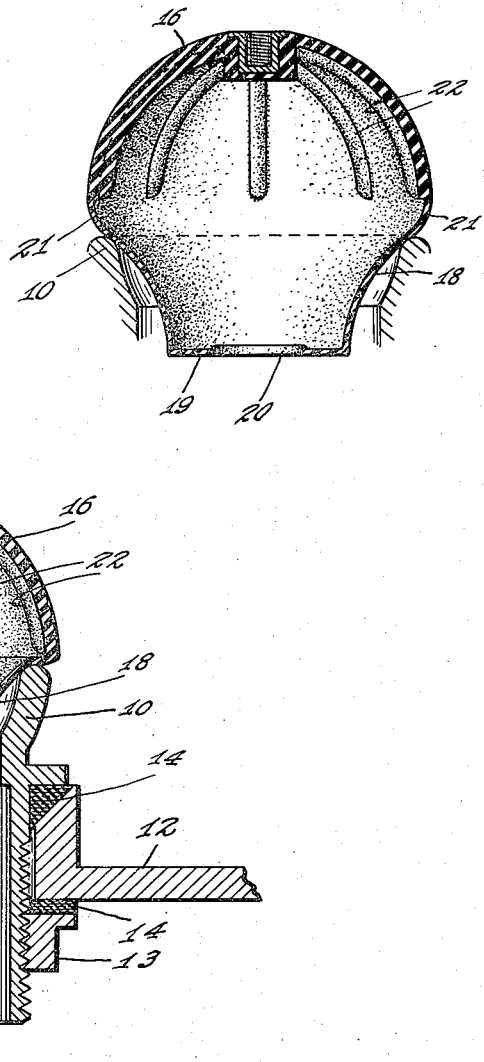

2,174,706

UNITED STATES PATENT OFFICE 2,174,706

FLUSH TANK VALVE

Frank J. Pardieck, Indianapolis, Ind.

Application December 22, 1937, Serial No. 181,097

4 Claims. (Cl. 4—56)

Flush-tank valves are customarily formed as hollow bodies of rubber or similar material which are held against an associated valve-seat by the pressure of liquid above them but which, when disengaged from the seat, tend to float and permit emptying the tank with which they are associated. Valve-seats for flush-tanks vary considerably both in shape and in diameter; and attempts have heretofore been made to produce a flush-tank valve which would co-operate satisfactorily with varying forms of seats. In general, prior flush-tank valves of which I am aware have had valve-seat engaging faces which were either plane, conical, or hemispherical. Valves with plane seat-engaging surfaces necessarily co-operate with a valve-seat surface which is frequently roughened by corrosion, and an imperfect seal is therefore obtained. The valves with conical or hemispherical valve-seat engaging surfaces tend to maintain only a line contact with the valve seat; and frequently in valves of this type hydraulic pressure on the upper surface of the valve tends to distort the valve-engaging surfaces in such a way that the line-contact effect is accented.

The accompanying drawing illustrates my invention: Fig. 1 is a fragmental vertical section through a flush tank on the axis of the valve and valve-seat showing the valve in the shape it assumes when subjected to the pressure of liquid in the tank; and Fig. 2 is a similar view showing the valve and valve-seat alone with the valve illustrated as unstressed by hydraulic pressure.

In accordance with customary practice, the valve seat 10 is indicated in the drawing as formed at the upper end of a bushing 11 which extends through the bottom 12 of a flush tank and is held in place by a nut 13, suitable packing 14 being provided to prevent leakage. As indicated, the inner surface of the valve seat 10 flares outwardly, the degree of such flaring and the diameter of the valve-seat rim varying considerably in practice.

My improved valve is formed as a hollow body of rubber or some similar material and comprises an upper dome-shaped portion 16 and a lower portion consisting of an annular side wall 18 and a plane bottom wall 19, the latter having a central opening 20, as is customary. The annular side wall 18 is so formed as to be outwardly concave in axial section. Its outer surface might be described as a surface of revolution generated by rotating about the valve-axis a curve which is convex toward that axis. At its top the annular side wall 18 joins the dome-shaped upper portion 16, preferably by a smooth curve indicated at 21 in the drawing, and the dome-shaped upper portion 16 is desirably stiffened against collapse by the provision on its inner surface of a series of integral ribs 22.

When a valve such as has been described engages its associated valve-seat, contact with the seat is made at some point along the annular wall 18, as is clear from Fig. 2. As liquid flows into the tank, downward pressure on the upper portion 16 of the valve increases, and the upper portion the annular wall 18 is bent downwardly tending to cause the outer surface of such annular wall to assume the curve of that part of the valve seat which it engages, thus increasing materially the area of contact between the valve seat and the annular wall. This effect is illustrated in Fig. 1, where the distortion of the annular wall 18 is clearly shown. Desirably, the valve, at the junction between its upper and lower portions is free from any circumferential stiffening which would tend to prevent that portion of the valve from spreading outwardly under the influence of hydraulic pressure; for a slight degree of spreading favors an increase in the area of contact between the valve seat and the annular wall.

I have noted that a valve of the shape described not only provides a seal which is more effective than valves of the conventional shapes but also that it seems to engage its valve seat with a more positive action as it closes. I believe this to be due to the venturi-like action of the liquid rushing between the seat and the adjacent surface of the closing valve, such venturi-like action creating a pressure reduction which tends to draw the valve to its seat and which, due to the shape of the annular wall 18, is effective over a greater area than in the case of conventional valves.

I claim as my invention:

1. A flush-tank valve, comprising a hollow body of resilient material having an imperforate dome-shaped upper portion, a lower valve-seat engaging portion which is concave outwardly in axial section, and a smoothly curved intermediate portion joining said upper and lower portions, said upper portion being provided with stiffening ribs radiating from its top and terminating short of said intermediate portion.

2. A flush-tank valve, comprising a hollow body of resilient material having an upper portion, a lower portion, and an intermediate portion; said upper portion being imperforate and dome-shaped; said lower portion having an annular side wall which, at its lower end, is of materially smaller diameter than the valve seat and which flares upwardly and is outwardly concave in axial section; said intermediate portion having an annular wall which is outwardly convex in axial section and which joins the upper and lower portions smoothly; said upper portion being provided with stiffening ribs radiating from its top and terminating short of said intermediate portion.

3. A flush-tank valve, comprising a hollow body of resilient material having an upper portion, a lower portion, and an intermediate portion; said upper portion being imperforate and dome-shaped; said lower portion having an annular side wall which, at its lower end, is of materially smaller diameter than the valve seat and which flares upwardly and is outwardly concave in axial section; said intermediate portion having an annular wall which is outwardly convex in axial section and which joins the upper and lower portions smoothly; said intermediate portion being free from stiffening, whereby it may conform to the shape of the associated valve seat when subjected to pressure.

4. A flush-tank valve, comprising a hollow body of resilient material having an upper portion, a lower portion, and an intermediate portion; said upper portion being imperforate and dome-shaped; said lower portion having an annular side wall which, at its lower end, is of materially smaller diameter than the valve seat and which flares upwardly and is outwardly concave in axial section; said intermediate portion having an annular wall which is outwardly convex in axial section and which joins the upper and lower portions smoothly; said valve being of largest diameter at the point where the upper and intermediate portions thereof join and being free from circumferential stiffening at that point, whereby it may expand radially when subjected to pressure.

FRANK J. PARDIECK.